United States Patent
Esquibel et al.

(10) Patent No.: US 10,110,046 B1
(45) Date of Patent: Oct. 23, 2018

(54) MOBILE TO MOBILE WIRELESS CHARGING

(71) Applicant: Marvell International Ltd., Hamilton (BM)

(72) Inventors: Begona Sanchez Esquibel, Valencia (ES); Patrick Clement, Belmont (CH); Francois Louis Dorel, Thonon-les-Bains (FR)

(73) Assignee: Marvell International Ltd., Hamilton (BM)

(*) Notice: Subject to any disclaimer, the term of this patent is extended or adjusted under 35 U.S.C. 154(b) by 137 days.

(21) Appl. No.: 15/191,450

(22) Filed: Jun. 23, 2016

Related U.S. Application Data

(60) Provisional application No. 62/184,370, filed on Jun. 25, 2015.

(51) Int. Cl.
| | |
|---|---|
| H02J 7/02 | (2016.01) |
| H02J 7/04 | (2006.01) |
| H02J 50/12 | (2016.01) |
| H02J 50/60 | (2016.01) |
| H04B 5/00 | (2006.01) |
| H04M 1/02 | (2006.01) |

(52) U.S. Cl.
CPC ............ *H02J 7/025* (2013.01); *H02J 7/027* (2013.01); *H02J 7/045* (2013.01); *H02J 50/12* (2016.02); *H02J 50/60* (2016.02); *H04B 5/0037* (2013.01); *H04M 1/0262* (2013.01)

(58) Field of Classification Search
CPC .. H02J 50/12; H02J 7/025; H02J 7/027; H02J 7/045; H02J 50/60; H04B 5/0037; H04M 1/0262
See application file for complete search history.

(56) References Cited

U.S. PATENT DOCUMENTS

| | | |
|---|---|---|
| 8,645,481 B2 | 2/2014 | Eaton |
| 2009/0111531 A1* | 4/2009 | Cui ............ H01Q 1/243 455/572 |
| 2012/0088555 A1 | 4/2012 | Hu |
| 2013/0088192 A1 | 4/2013 | Eaton |
| 2013/0091225 A1 | 4/2013 | Eaton |

(Continued)

OTHER PUBLICATIONS

Olga Kharif, "What's Costliest Part of Smartphone? Hint: It's Not the Display", Bloomberg Tech Blog, http://go.bloomberg.com/tech-blog/2012/05/09/, May 9, 2012, 5 pages.

(Continued)

*Primary Examiner* — Robert Deberadinis

(57) ABSTRACT

The present disclosure describes systems and techniques relating to wireless charging of mobile devices, such as smartphones and wearable devices. According to an aspect of the described systems and techniques, a mobile data processing device includes: a display; a processor; a memory system; wireless communication hardware; a battery; a coil; and wireless charging circuitry coupled between the coil and the battery; wherein the wireless charging circuitry is configured to charge the battery using power received wirelessly through the coil, and wherein the wireless charging circuitry is further configured to draw power from the battery and operate the coil to wirelessly transmit the power from the battery to another mobile data processing device.

18 Claims, 9 Drawing Sheets

(56) References Cited

U.S. PATENT DOCUMENTS

| | | |
|---|---|---|
| 2013/0157565 A1 | 6/2013 | Clement |
| 2014/0117921 A1* | 5/2014 | Suomela ............. H04B 5/0031 |
| | | 320/103 |
| 2014/0156772 A1 | 6/2014 | Eaton |
| 2014/0347009 A1 | 11/2014 | Hongo |
| 2015/0042266 A1 | 2/2015 | Chen |
| 2017/0346340 A1* | 11/2017 | Vitali ..................... H02J 50/12 |

OTHER PUBLICATIONS

Adriana Lee, "Wireless Charging Takes a Step Toward the Mainstream," ReadWrite, http://readwrite.com/2014/02/11/wireless-charging-standards-agreement, Feb. 11, 2014, 2 pages.

"Inductive Charging", Wikipedia, https://en.wikipedia.org/wiki/Inductive_charging, downloaded from the Internet Nov. 12, 2015, 6 pages.

"Power management integrated circuit", Wikipedia, https://en.wikipedia.org/wiki/Power_management_integrated_circuit, downloaded from the Internet Nov. 12, 2015, 2 pages.

"Resonant inductive coupling", Wikipedia, https://en.wikipedia.org/wiki/Resonant_inductive_coupling, downloaded from the Internet Nov. 12, 2015, 9 pages.

* cited by examiner

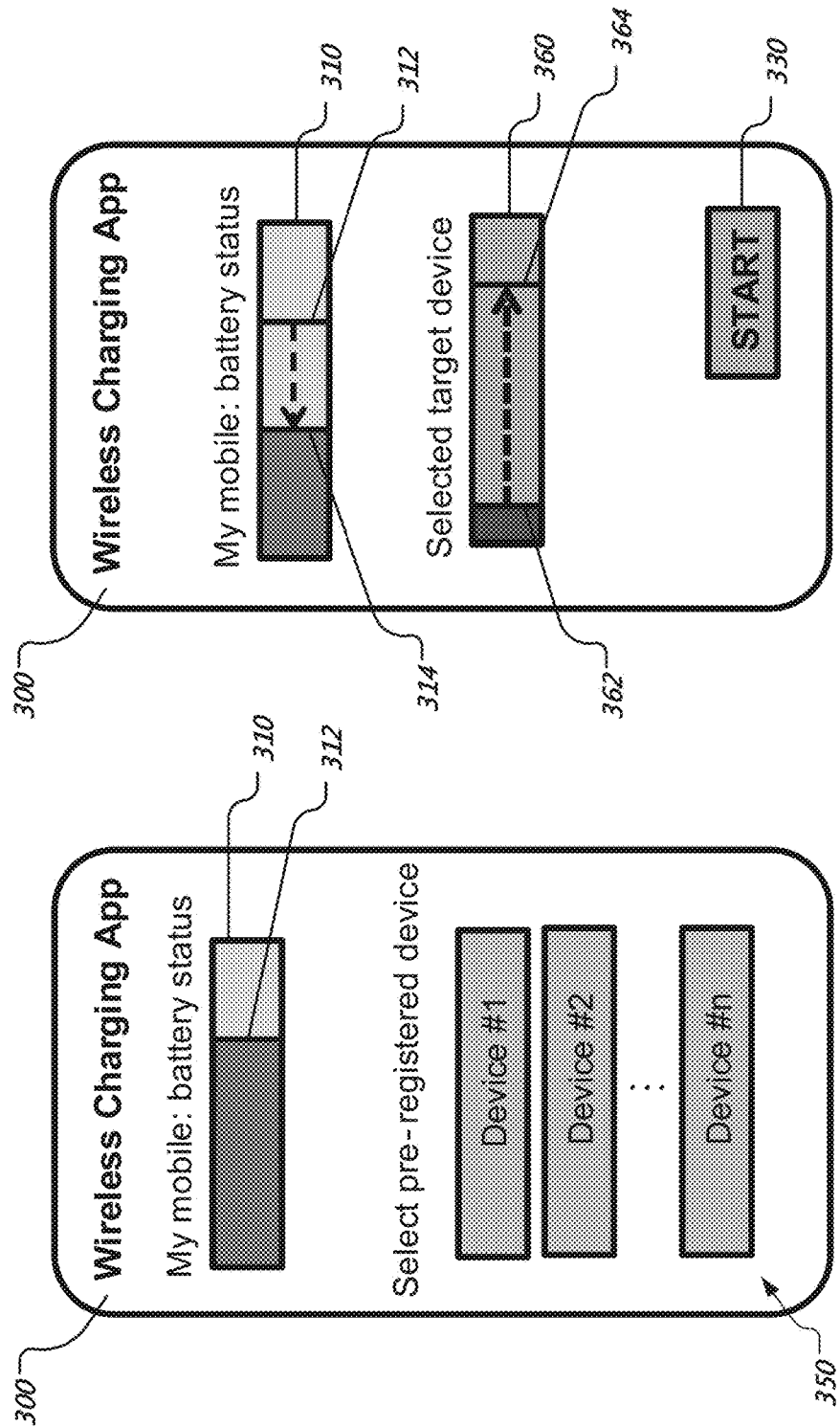

MOBILE TO MOBILE WIRELESS CHARGING

CROSS REFERENCE TO RELATED APPLICATIONS

This application claims the benefit of the priority of U.S. Provisional Application Ser. No. 62/184,370, filed Jun. 25, 2015 and entitled "MOBILE WIRELESS CHARGER: MOBILE TO WEARABLE AND MOBILE TO MOBILE", which is incorporated herein by reference.

BACKGROUND

The present disclosure describes systems and techniques relating to wireless charging of devices, for example, mobile devices such as mobile phones, smartphones, multimedia phones, portable media players, Global Positioning System (GPS) units, portable gaming systems, tablets, palm tops, and wearable devices.

A mobile device is often built from multiple devices, which can include a radio chip coupled with an antenna, a general purpose processor, and inertial and/or MEMS (Micro-Electromechanical Systems) sensors. In addition, some mobile devices include wireless charge receiving circuitry that enables charging of the battery in the device without needing to plug the device into the source of electricity with a wire or cable. For example, some smartphones and wearables (e.g., smart watches, personal fitness devices, and health monitor devices) include wireless charge receiving circuitry that allows the mobile device to be simply dropped onto a charging plate or table to recharge its battery.

SUMMARY

The present disclosure describes systems and techniques relating to wireless charging of mobile devices, such as smartphones and wearable devices. According to an aspect of the described systems and techniques, a first device includes: a display; a processor coupled with the display; a memory system coupled with the processor; wireless communication hardware coupled with the memory system and the processor; a battery coupled with the display, the processor, the memory system and the wireless communication hardware; a coil; and wireless charging circuitry coupled between the coil and the battery; wherein the wireless charging circuitry is configured to charge the battery using power received wirelessly through the coil, and wherein the wireless charging circuitry is further configured to draw power from the battery and operate the coil to wirelessly transmit the power from the battery to a second device.

The first device can be a smartphone having a first side and a second side, the display can be disposed on the first side, and the coil can be disposed opposite the display and adjacent to the second side. The second device can be a wearable device, a smartphone, or other device able to receive wirelessly transferred power. In addition, the wireless charging circuitry can be configured to use inductive coupling between coils to wirelessly transmit the power from the battery to the second device.

The first device can include a power management integrated circuit (PMIC) chip including the wireless charging circuitry. The first device can include a PMIC chip coupled with the wireless charging circuitry, wherein the wireless charging circuitry includes wireless charging interface circuitry in another integrated circuit chip separate from the PMIC. Further, in some implementations, the wireless charging circuitry is configured to use resonant inductive coupling between coils to wirelessly transmit the power from the battery to the second device. Moreover, the coil can be a single coil, and the wireless charging circuitry can include: receiver circuitry configured to charge the battery using the power received wirelessly through the single coil; transmitter circuitry configured to draw the power from the battery and operate the single coil to wirelessly transmit the power from the battery to the second device; and protection and power transfer optimization circuitry between the receiver circuitry and the transmitter circuitry.

The memory system can encode instructions for the processor, where the instruction are configured to: present a user interface on the display; receive input through the user interface that indicates an amount of power to provide to the second device; monitor power draw from the battery during operation of the coil to wirelessly transmit the power from the battery to the second device; and terminate the wireless power transmission to the second device when the indicated amount of power has been provided. The instructions encoded in the memory system can also be configured to cause the processor to present in the user interface on the display a charge level of the battery, and the received input can include input to indicate an amount of power to reserve in the battery after the wireless power transmission to the second device.

The instructions encoded in the memory system can be configured to cause the processor to present in the user interface on the display a charge level of a battery of the second device, and the received input can include input received as either a specified lower charge level for the battery coupled with the display or a specified target charge level for the battery of the second device after the wireless power transmission to the second device. Further, the display can include a touchscreen, and the instructions encoded in the memory system can be configured to cause the processor to present draggable user interface charge markers in the user interface through which the input is received, a first of the draggable user interface charge markers being usable to specify the lower charge level for the battery coupled with the display, and a second of the draggable user interface charge markers being usable to specify the target charge level for the battery of the second device, wherein the first and second draggable user interface charge markers are co-responsive to each other.

In some implementations, the instructions encoded in the memory system are configured to cause the process to: receive input that specifies two or more charge amounts for two or more second devices; and store the input for later use when respective ones of the two or more second devices are paired with the data processing device. In some implementations, the instructions encoded in the memory system are configured to cause the process to: find two or more second devices that can receive power wirelessly; register at least one of the two or more second devices; and present the at least one registered second device in the user interface enabling selection for wireless power transfer to the at least one registered second device.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable hardware processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

The described systems and techniques can result in one or more of the following advantages. Mobile devices can be charged in various locations where access to a wall plug or power mains is not readily available. One mobile device (e.g., a smartphone or tablet computer) with a relatively large battery can act as a wireless energy hub for other mobile devices that do not require as much power (e.g., wearables devices, such as a personal fitness device). In addition, user interfaces and control systems can be provided that facilitate wireless power transfer from a mobile device to multiple other mobile devices.

Details of one or more implementations are set forth in the accompanying drawings and the description below. Other features and advantages may be apparent from the description and drawings, and from the claims.

DRAWING DESCRIPTIONS

FIGS. 3A-3C show examples of user interface elements for a wireless charging app.

Like reference numbers in the various drawings indicate like elements.

DETAILED DESCRIPTION

Figure 1A:
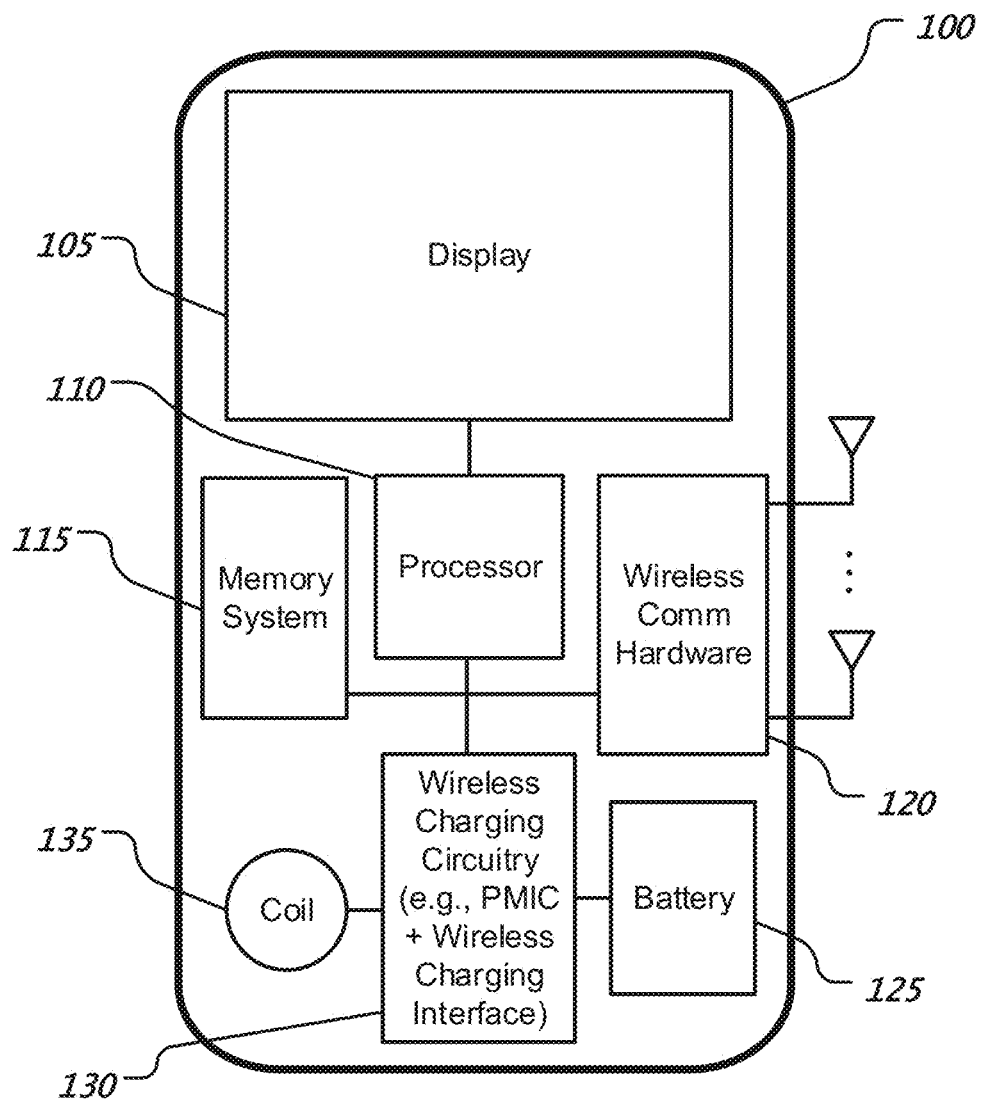
FIG. 1A shows an example of a mobile data processing device.

FIG. 1A shows an example of a mobile data processing device 100. In this example, the device 100 is a smartphone, but the systems and techniques described can be implemented in other mobile data processing devices. The device 100 includes a display 105, which can be a touchscreen display device through which input is received in addition to providing output. In some implementations, the display 105 can form substantially all of the front side of the device 100. FIG. 1A shows the components of the device 100 in schematic block diagram form to simplify the illustration of the device's components.

The mobile device 100 also includes a processor 110 and a memory system 115. The processor 110 can include various types of processor hardware, including a microprocessor, a multi-core processor, a general purpose programmable processor, a digital signal processor (DSP), or combinations thereof. In some implementations, more than one processor 110 can be included in the mobile device 100, and such processors can be integrated into other components of the device 100 (e.g., integrated microprocessors or controllers). The memory system 115 includes a computer-readable medium, such as circuit elements of a solid state memory device, magnetic discs of a hard disk drive, or a combination of these. Moreover, the memory system 115 can encode instructions in such computer-readable media that cause the mobile device 100 to perform the operations described herein. Such instructions can be provided in the form of firmware or software that operates on the processor(s) 110.

The device 100 can also include wireless communication hardware 120, which can include various types of transceiver electronics and one or more antennas. In FIG. 1A, the antennas are shown extending from the wireless communication hardware 120 for ease of illustration. It should be noted that in many implementations, the one or more antennas can be integrated into a housing of the mobile device 100. Furthermore, the wireless communication hardware 120 can be configured to communicate using multiple different types of wireless communication technologies, such as near field communications (NFC), Bluetooth, WiFi, and one or more mobile phone technologies, such as WCDMA (Wideband Code Division Multiple Access), CDMA2000, UMTS (Universal Mobile Telecommunications System), GSM (Global System for Mobile communications), High Speed Packet Access (HSPA), and LTE (Long-Term Evolution, often referred to as 4G).

In some implementations, the wireless communication hardware 120 implements wireless local area network (WLAN) technologies as defined in one or more wireless standards, e.g., IEEE (Institute of Electrical and Electronics Engineers) 802.11 standards. In general, the wireless communication hardware 120 can include one or more controllers and one or more modems to handle one or more different wireless technologies employed by the mobile device 100, and the one or more antennas can be shared by different wireless technology modems, dedicated to a particular wireless technology, and/or two or more antennas can be used for a given wireless technology. For example, in some implementations, a set of antennas can be used for multiple input multiple output (MIMO) communications.

The mobile device 100 also includes one or more batteries 125, wireless charging circuitry 130, and one or more coils 135. The one or more batteries 125 can employ various battery technologies (e.g., a lithium-ion battery). The one or more coils 135 can be designed for inductive coupling or resonant inductive coupling for wireless energy transfer. Furthermore, the wireless charging circuitry 130 is configured to charge the battery 125 using power received wirelessly through the coil 135, and the wireless charging circuitry 130 is further configured to draw power from the battery and operate the coil to wirelessly transmit the power from the battery to another mobile data processing device.

By designing the wireless charging circuitry 130 to transmit as well as receive energy wirelessly, the mobile device 100 can act as a source as well as a destination of wireless power transfer. Note that the battery 125 can have sufficient capacity to provide some of its stored energy to another mobile device while still retaining enough stored energy to operate the mobile device 100. In some implementations, charging plate type circuitry can be added to the mobile device 100, and the mobile device 100 can include a first coil 135 for receiving wireless power and a second coil 135 for transmitting wireless power. In other implementations, a single coil 135 can be used for both receiving and transmitting wireless power.

In some implementations, the wireless charging circuitry 130 includes circuit elements that control inductive coupling between coils to wirelessly transmit power from the battery 125 to other mobile data processing devices. In some implementations, the wireless charging circuitry 130 includes circuit elements that control resonant inductive coupling between coils to wirelessly transmit power from the battery 125 to other mobile data processing devices. In some implementations, the wireless charging circuitry 130 is included in a power management integrated circuit (PMIC). In some implementations, the wireless charging circuitry 130 includes wireless charging interface circuitry that couples with the PMIC. Further, the wireless charging interface circuitry and the PMIC can be on separate integrated circuit (IC) chips or on the same IC chip.

In some implementations, the transmitter and/or receiver circuitry of the wireless charging circuitry 130 complies with one or more wireless charging standards, such as the Wireless Power Consortium (WPC) Qi wireless charging standard and the Alliance for Wireless Power (A4WP) wireless charging standard. Moreover, in some implementations, the device 100 includes other components, such as a Global Positioning System (GPS) receiver, an accelerometer, a camera, a microphone, speakers, a compass, other sensors, etc. In various implementations, the components of the device 100 described above can be implemented using one or more IC chips, one or more system-on-chips, one or more printed circuit boards, or combinations thereof.

Figure 1B:
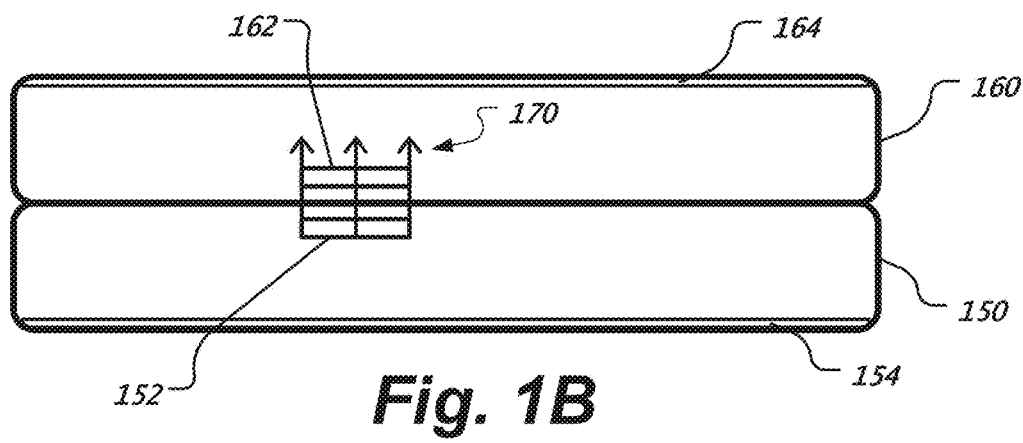
FIG. 1B shows an example of a first smartphone wirelessly charging a second smartphone.

FIG. 1B shows an example of a first smartphone 150 wirelessly charging a second smartphone 160. Each of the smartphones 150, 160 can include components as described above in connection with FIG. 1A. In addition, while the smartphone 150 includes one or more coils 152 (e.g., a wireless power transceiver coil, or a wireless power receiver coil plus a wireless power transmitter coil) and wireless charging circuitry for both receiving and transmitting wireless power, the smartphone 160 can be a device that can only receive wireless power and not transmit wireless power.

The first smartphone 150 has the coil(s) 152 located in a rear side of the device, as shown, opposite a display 154 of the smartphone 150. Thus, the first smartphone 150 can function in a manner similar to a traditional wireless charging plate in that it can charge one or more other devices that include at least a wireless receiver coil, such as a coil 162 of the smartphone 160. As shown, the two smartphones 150, 160 can be placed back-to-back, such that a display 164 of the smartphone 160 and/or a display 154 of the smartphone 150 can be viewed while energy is transferred 170 wirelessly between the two devices. The coils 152, 162 are adjacent to the rear sides of the respective mobile devices 150, 160 and are in sufficient proximity to each other to allow wireless power transfer 170.

Figure 1C:
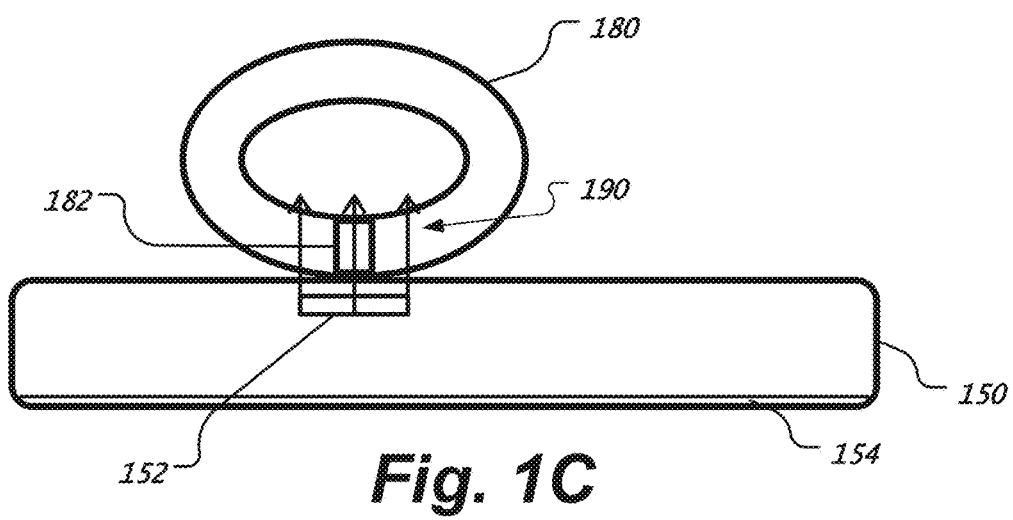
FIG. 1C shows an example of a smartphone wirelessly charging a wearable device.

Further, as noted, other devices can also be charged. FIG. 1C shows an example of the smartphone 150 wirelessly charging a wearable device 180. The wearable device 180 (e.g., a smart watch, a smart bracelet, a personal fitness device, etc.) includes at least one coil 182 and associated wireless charge receiving circuitry to enable wireless energy transfer 190 from a battery of the smartphone 150 to a battery of the wearable device 180. Furthermore, in some implementations, the smartphone 150 can include program instructions (e.g., an app or an operating system component) usable to enable a charging mode on the smartphone 150 to start up the transmitter coil 152 and control the wireless charging function. Such a program can also include features that facilitate the charging process for multiple different devices, as described in further detail below.

Figure 2A:
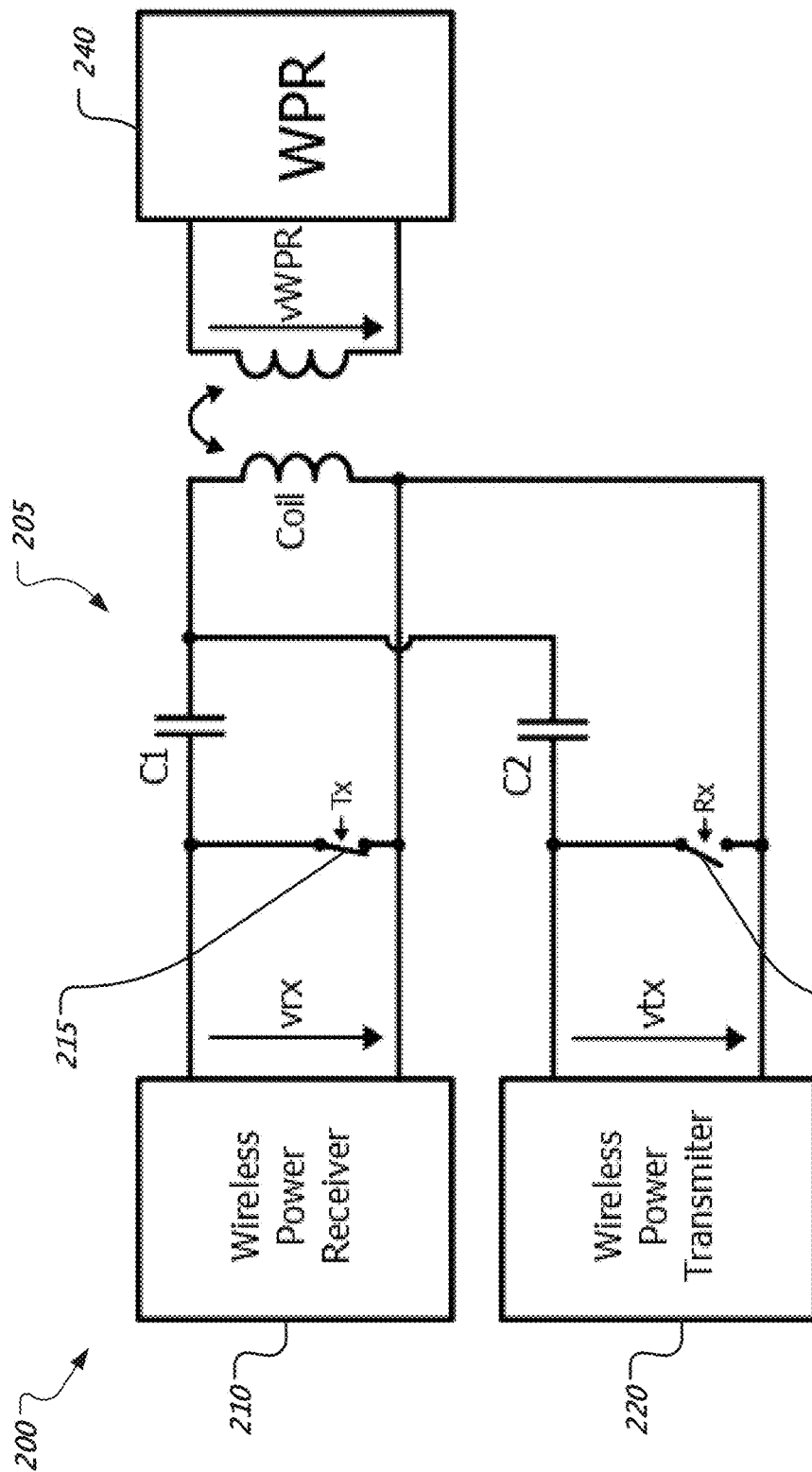
FIGS. 2A-2D show examples of wireless charging circuitry.

In addition, as noted above, a single coil 152 can be used for both reception and transmission of wireless power transfer. FIG. 2A shows an example of wireless charging circuitry 200 that can be used with a single coil to provide wireless power transfer to or from another device. The wireless charging circuitry 200 includes a wireless power receiver 210, a wireless power transmitter 220 and protection circuitry 205 (e.g., protection and power transfer optimization circuitry) there between. The wireless power receiver 210 includes receiver circuitry configured to charge a local battery of the mobile device containing the wireless charging circuitry 200 using the single coil, and the wireless power transmitter 220 includes transmitter circuitry configured to draw power from the local battery and operate the single coil to wirelessly transmit this power to another mobile device. The receiver circuitry and transmitter circuitry can be implemented as described above.

In addition, the protection circuitry 205 includes at least one capacitor C1 on a receiver (Rx) side and at least one capacitor C2 on a transmitter (Tx) side to implement a matching network for power transfer optimization. The protection circuitry 205 further includes Tx switch 215 and Rx switch 225. In the configuration shown, the wireless charging circuitry 200 is set in Tx mode. Thus, the Tx switch 215 is closed and the Rx switch 225 is open while power is being wirelessly transferred to a wireless power receiver (WPR) device 240 (e.g., a smartphone or a wearable device). Turning the Tx switch 215 ON avoids power dissipation in the local wireless power receiver 210 while also protecting receiver input against voltage stress (vrx=0), and the matching network (e.g., C1 & C2) can optimize power transfer to the WPR device 240 with its corresponding voltage drop (vWPR) across the WPR coil.

Figure 2B:
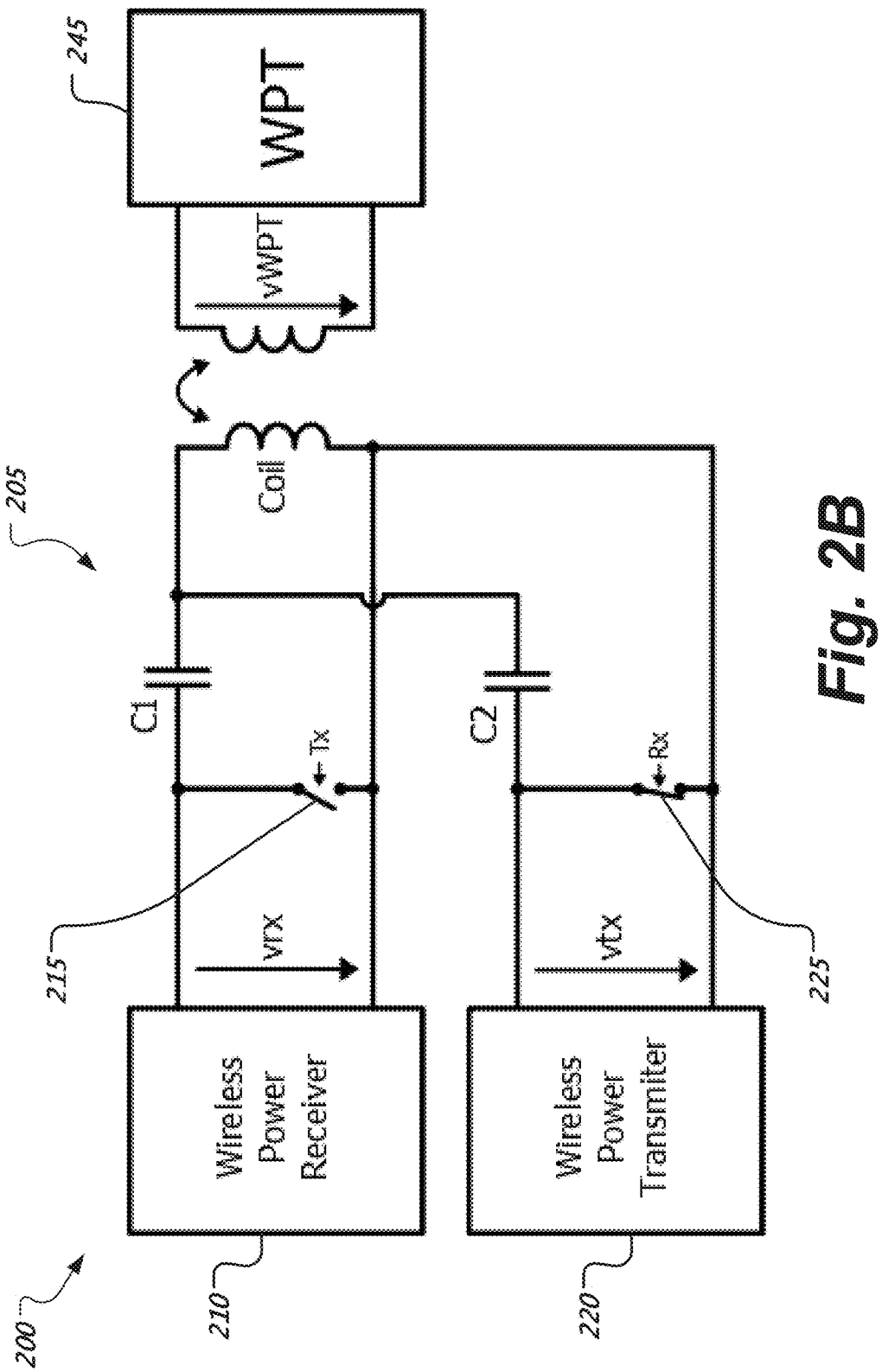

FIG. 2B shows the configuration of the protection circuitry 205 in the Rx mode, where the mobile device is receiving wireless power from a wireless power transmitter (WPT) device 245 (e.g., a smartphone or a charging plate). The Rx switch 225 is now closed, and the Tx switch 215 is open, while power is being wirelessly transferred from the WPT device 245. Turning the Rx switch 225 ON avoids power dissipation in the local wireless power transmitter 220 while also protecting transmitter input against voltage stress (vtx=0), and the matching network (e.g., C1 & C2) can optimize power transfer from the WPT device 245 with its corresponding voltage drop (vWPT) across the WPT coil.

Figure 2C:
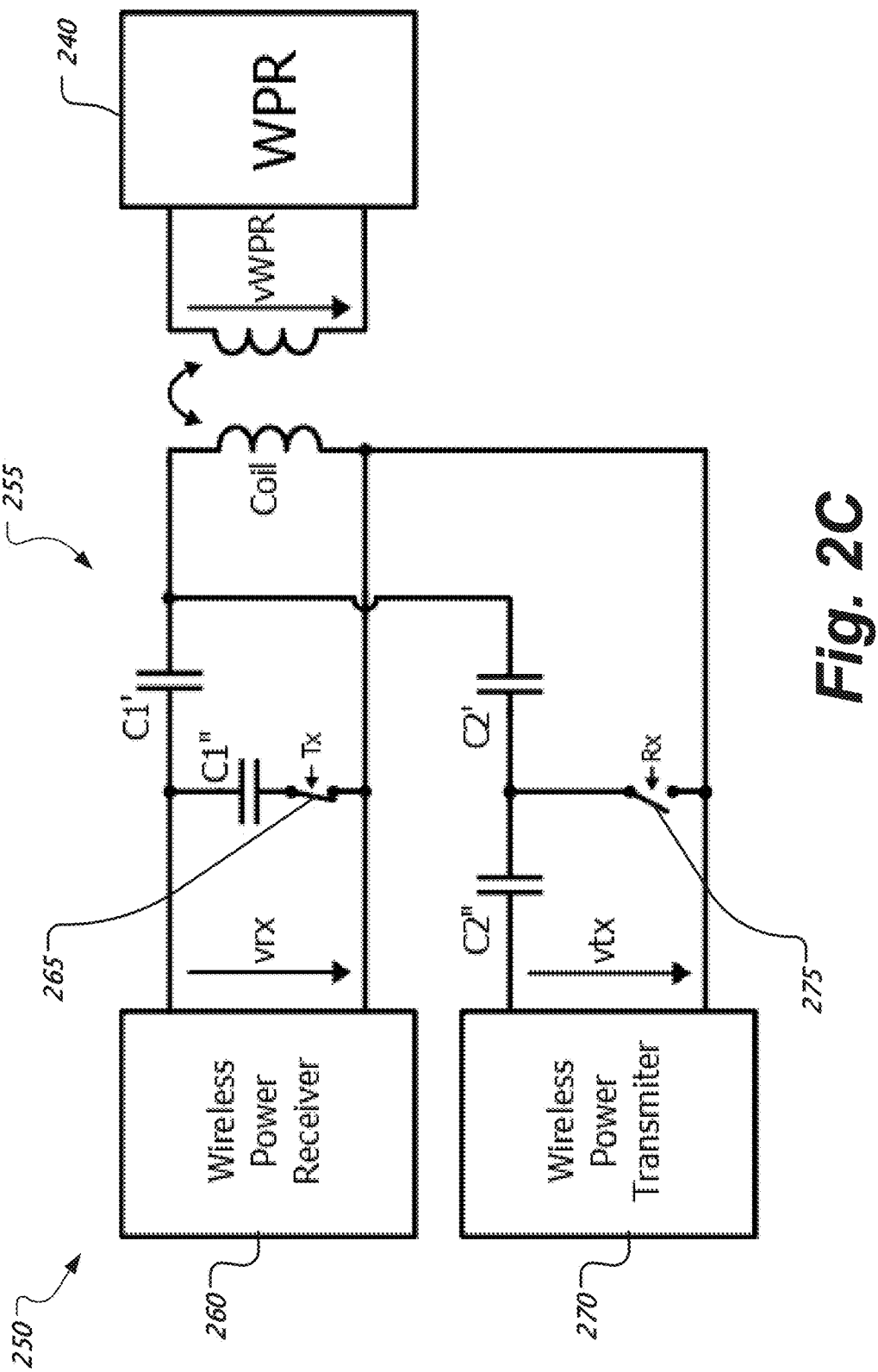
Figure 2D:
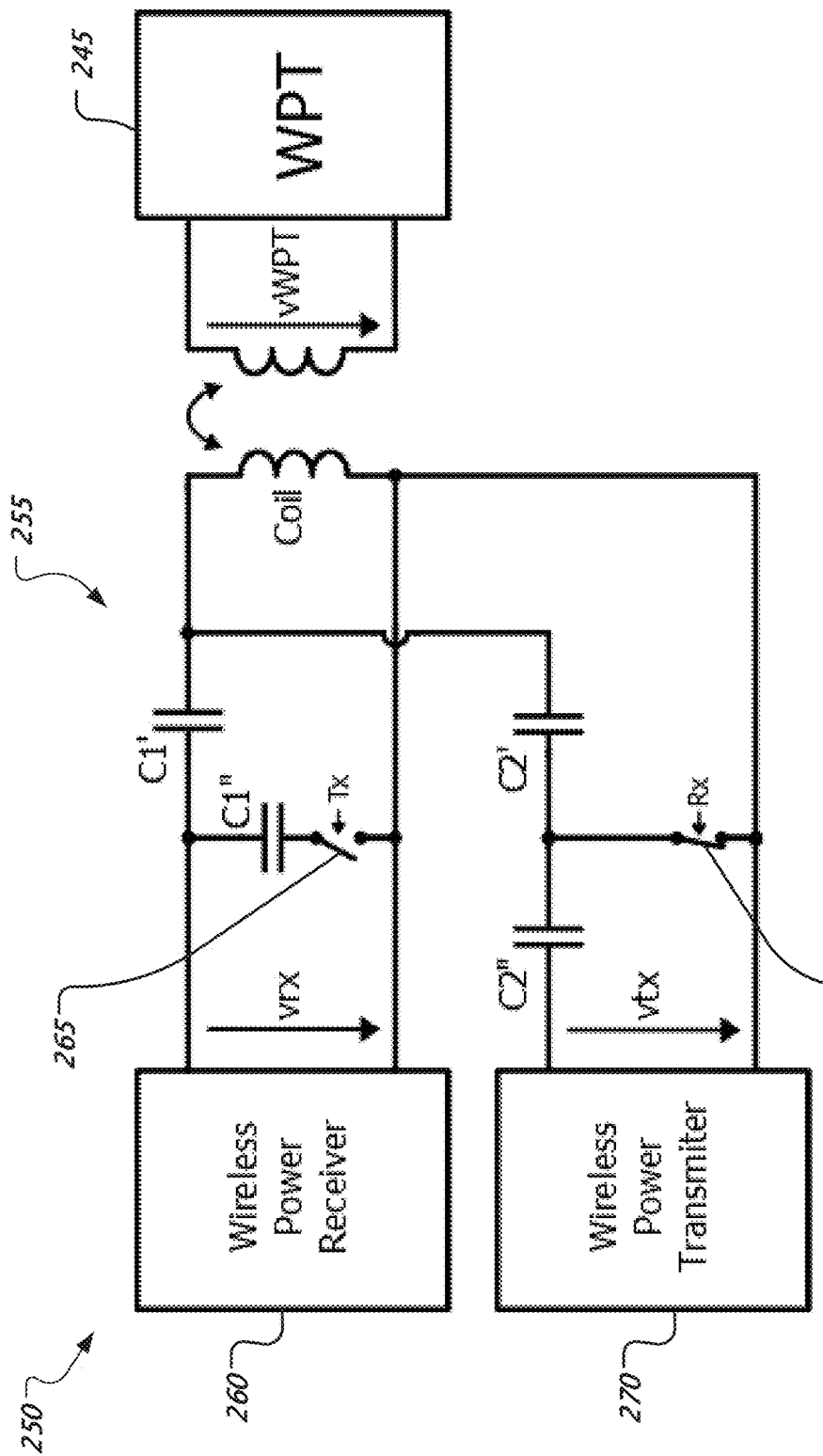

FIGS. 2C & 2D show another example of wireless charging circuitry that can be used with a single coil to provide wireless power transfer to or from another device. In this example, wireless charging circuitry 250 includes a wireless power receiver 260, a wireless power transmitter 270 and protection circuitry 255 there between. The wireless power receiver 260 and the wireless power transmitter 270 can be implemented in a manner similar to that of the wireless power receiver 210 and the wireless power transmitter 220. In addition, the protection circuitry 255 can be enhanced, as shown.

In this example, the capacitor C1 has been split into two capacitors C1' and C1", and the capacitor C2 has been split into two capacitors C2' and C2". This expansion of the matching network can enable further optimization of power transfer to WPR device 240 and from WPT device 245. FIG. 2C shows Tx switch 265 and Rx switch 275 in the Tx mode (i.e., Tx switch 265 is ON, and Rx switch 275 is OFF). FIG. 2D shows the Tx switch 265 and the Rx switch 275 in the Rx mode (i.e., Tx switch 265 is OFF, and Rx switch 275 is ON). In addition, note that in some implementations, two additional pins will be needed if the Tx switch 265 and the Rx switch 275 are integrated with a transmitter/receiver IC.

Figure 3A:
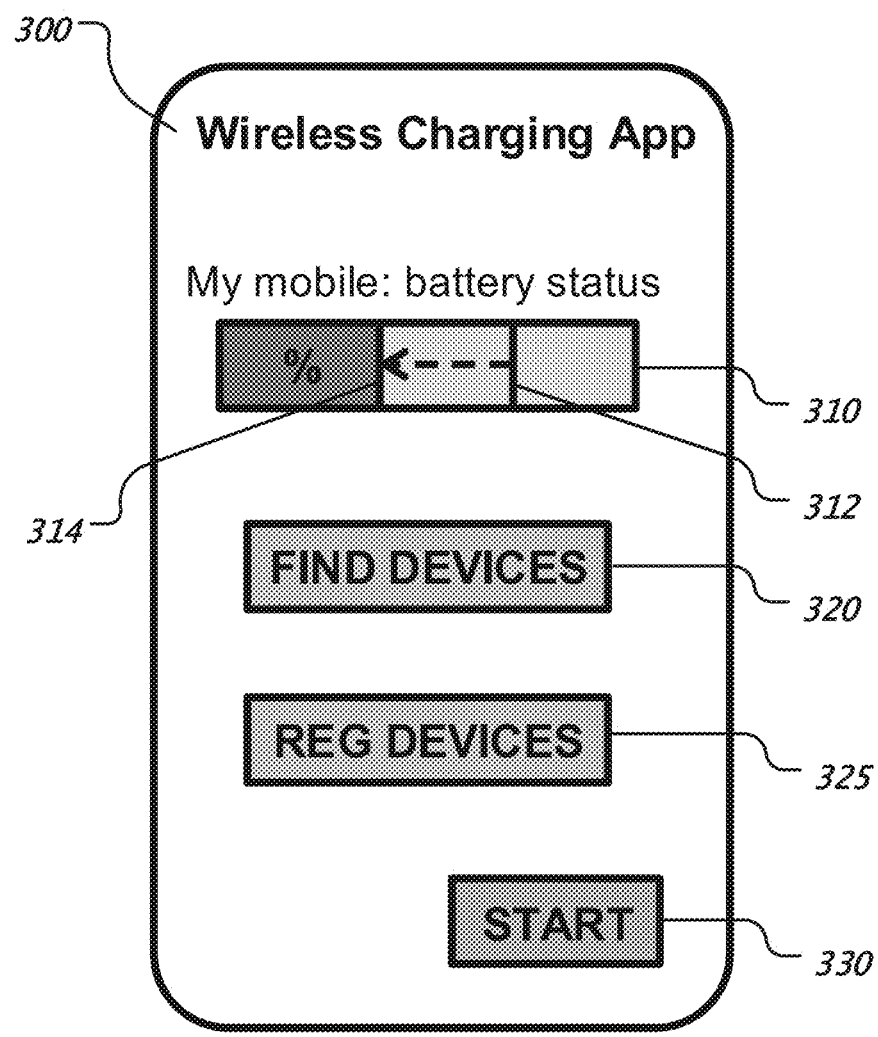

FIGS. 3A-3C show examples of user interfaces for a wireless charging app 300. Although described as an app (e.g., for a smartphone), the software used to facilitate the supply of wireless power to other devices can be implemented within the operating system of the mobile device as well. The wireless charging app 300 can be pre-installed on mobile device or be installed by a user. In some implementations, the user launches the wireless charging app 300 to activate the transmitter coil hardware, control wireless power transfer settings and start the supply of energy wirelessly to another device.

FIG. 3A shows the wireless charging app 300 presenting a user interface (UI) with a battery status UI element 310 for the mobile device, a find devices UI element 320, a register devices UI element 325, and a start UI element 330 to begin a selected operation. The battery status UI element 310 can be employed by a user of the mobile device to set parameters to control how charging will occur. A marker 312 shows the current charge level of the battery in relation to a maximum charge level of the battery, which is indicated by the total width of the UI element 310. In addition, a UI marker 314 can be adjusted by the user (e.g., by dragging it from the location of the marker 312 to a new location indicating less charge) to set how much battery power the user would like to keep (e.g., as a percentage of total battery charge capacity) for the mobile device after the wireless charging of another mobile device. The difference between the current charge level indicated by marker 312 and the final charge level indicated by marker 314 is the amount of charge made available from the local battery to charge one or more other mobile devices.

Alternative and/or additional UI elements can also be included. For example, the UI can include a field for a user to type in a specified amount of charge to provide to another mobile device or a specified amount of charge to retain on the local mobile device. As another example, the UI of the wireless charging app 300 can include a UI interface element through which the user can specify the types of other devices (e.g., smartphone or wearable device) to charge, as well potentially showing recommendations for how much charge to provide to respective other devices based on the nature of the device. As yet another example, the UI of the wireless charging app 300 can include one or more additional UI interface elements through which the user can specify how much time the user wants to spend charging other devices, whether fast charge is desired (e.g., advising on certain special setup options like setting "airplane mode" in both devices to reduce the power consumption during the charge), and whether or not to log mobile-to-mobile charging session(s).

In addition, as shown, the UI of the wireless charging app 300 can include UI elements 320, 325 to facilitate handling of multiple other devices. The find devices UI element 320 can be used to find any nearby mobile device that can be charged from this mobile device. For example, Bluetooth discovery or wireless charging device discovery processes can be used to identify other mobile devices that are currently within range and able to receive wireless power. The settings for wireless power transfer can be set differently for each such found mobile device. In addition, the register devices UI element 325 can be used to register other mobile devices with this mobile device and/or define charging settings for registered devices, such that different power transfer settings can be stored for respective registered devices (e.g., a specific registered wearable device can have settings that indicate automatically providing wireless power to the wearable device whenever that wearable device is in range and has a battery charge level below a certain threshold, whereas a specific registered smartphone can have settings that indicate the user should be prompted to confirm that wireless power should be provided).

FIG. 3B shows an example of the UI of the wireless charging app 300 where the battery status UI element 310 shows the current charge level of the battery in relation to a maximum charge level by marker 312, and UI elements 350 identify pre-registered mobile devices (Device #1, Device #2, . . . , Device #n) that can be selected. Once one such device is selected, the UI changes as shown in FIG. 3C to allow the user to drag down the marker 314 to specify the amount of battery charge to keep on the mobile device after the wireless power transfer to this specific registered device.

Note that the mobile device can communicate with the registered device to determine battery capacity and current charge level of this other device. Thus, the UI of the wireless charging app 300 can also present a UI element 360 to indicate the battery capacity of the target device along with a marker 362 to indicate the current charge level of that other device in relation to the total charge capacity of the other device, which is indicated by the total width of the UI element 360. Moreover, based on the respective battery capacities, the UI of the wireless charging app 300 can automatically present a marker 364 to indicate the expected battery status of the target device after the wireless charging.

In some implementations, both the marker 314 and the marker 364 can be dragged by the user. Thus, the user can have the option of specifying the amount of charge to retain on the source mobile device's battery or the charge level to achieve on the target device. In either case, the two markers 314, 364 can be made co-responsive to each other such that the UI can automatically show the result of the planned charging in real-time based on the known battery charge details of the two devices (i.e., as the user drags down or up the marker 314, the marker 364 will automatically move up or down accordingly, and as the user drags up or down the marker 364, the marker 314 will automatically move down or up accordingly). Once the user is satisfied with the planned charging details, the start UI element 330 can be selected to begin the wireless charging. Note that while FIG. 3C is presented in the context of a pre-registered device, the same UI functionality can be used with an unregistered device that is currently in proximity and able to receive electrical energy wirelessly.

Figure 4:
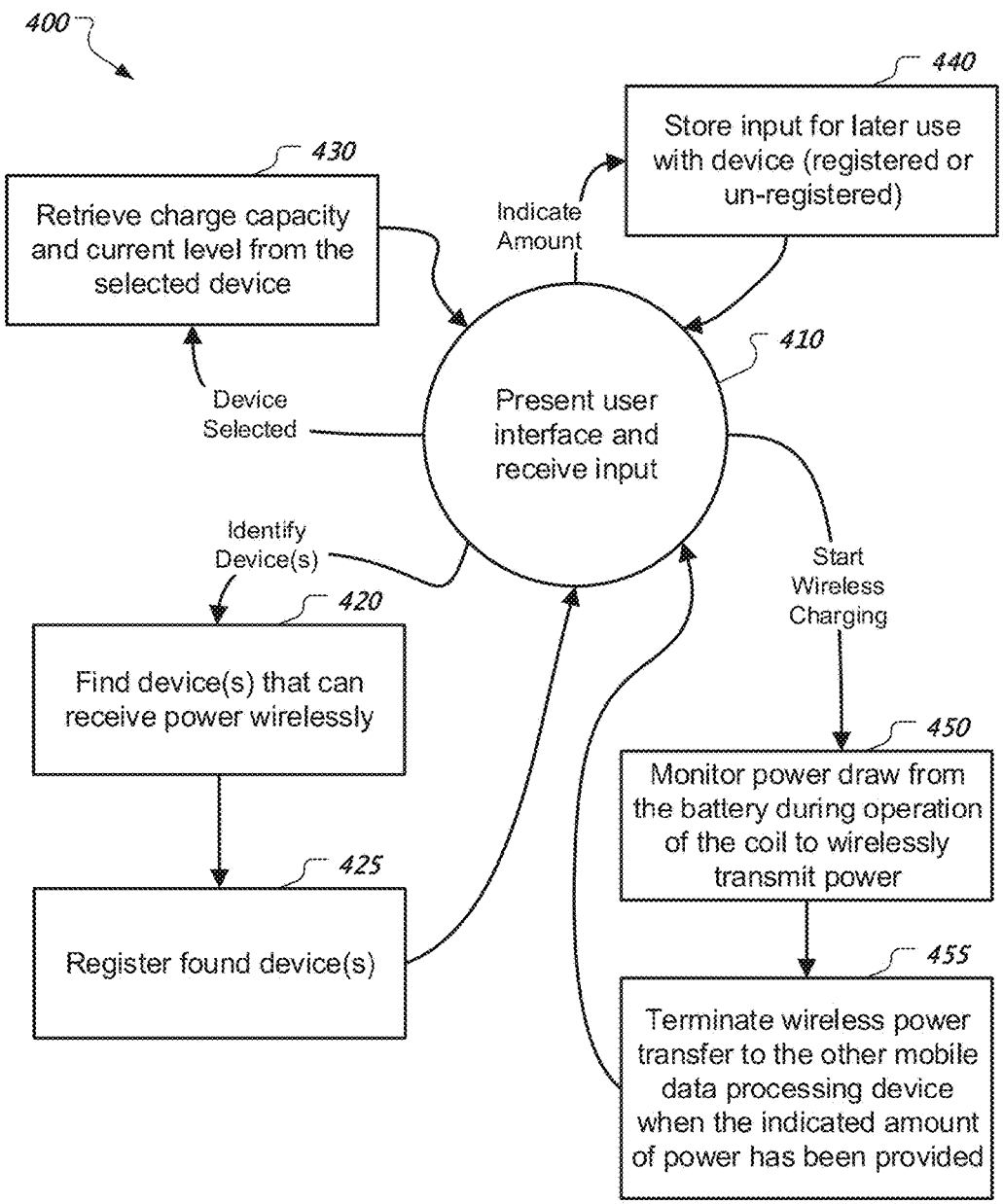
FIG. 4 shows an example of a process in accordance with some implementations.

FIG. 4 shows an example of a process 400 in accordance with some implementations. For example, the process 400 can be performed by the device 100 described above. At 410, a UI is presented on the display of a mobile data processing device (e.g., in response to a user opening a wireless charging control app using a touchscreen of a smartphone or a tablet computer). The UI can include a UI element that shows both a total charge capacity and a current charge level of the local battery. In addition, the UI can present various options for controlling wireless power transfer provided from the mobile data processing device. Various types of input can be received at 410.

At 420, in response to an indication to identify one or more devices that are available for wireless power transfer, such device(s) (e.g., two or more mobile devices) are found. This can involve the use of discovery processes, as noted above, to identify mobile devices that can receive power wirelessly from the mobile device running the process 400. At 425, such found devices can be registered with the mobile data processing device such that authentication operations can be automatically performed or skipped prior to wireless charging. Then, the found devices, the registered devices, or both can be presented in the UI at 410 to enable a user to select one or more devices for wireless power transfer.

When the user input selects a mobile data processing device (an un-registered or a registered found device) for wireless charging, the mobile device running the process 400 can retrieve charge capacity and current charge level information from the selected mobile device at 430. In some implementations, this involves communicating with the selected device using wireless communication hardware (e.g., Bluetooth and/or NFC). The charge capacity of the battery for the selected device and the current charge level of the battery of the selected device can then be presented in the UI at 410. For example, this can involve presenting UI elements as described above in connection with FIG. 3C.

At 410, the user can then provide input through the UI to indicate an amount of power to provide to the selected device. This indication can be direct or indirect. For example, the user can directly specify an amount of power to provide to the selected device by specifying an amount of power to transfer. Alternatively, the user can indirectly specify an amount of power to provide to the selected device by specifying an amount of power to retain in the battery of the device acting as the source of wireless power transfer. In addition, the indication of power transfer amount can be provided as input, at 410, that specifies power transfer as either a lower charge level for the battery of the source device (in relation to a current charge for that battery) or a higher charge level for the battery of the destination device (in relation to a current charge for that battery).

In any case, at 440, the indicated amount of power transfer can be stored for later use with the destination device, which can be a registered device or an unregistered device. In addition, as noted above, such power transfer amounts can be separately indicated for different destination devices. Other wireless charging parameter settings can also be received and stored, including one or more settings that apply across devices and one or more settings that are specific to individual devices, types of devices, or combinations of these. For example, in some implementations, a user's personal wearable device can be prioritized over other mobile devices.

Finally, when a target mobile device is within range for wireless charging, this can be indicated in the UI, at 410, and input can be received to start wireless charging. At 450, power draw from the battery can be monitored during operation of the coil to wirelessly transmit the power from the battery to the other mobile data processing device. Additionally or alternatively, the source device can communicate with the target device while the wireless charging progresses to obtain feedback on the increasing charge level of the target device's battery. At 455, wireless power transmission to the other mobile data processing device can be terminated when the indicated amount of power has been provided to the target device. This can involve terminating the wireless power transfer when the charge level of the battery of the source device reaches a pre-defined lower level, this can involve terminating the wireless power transfer when the charge level of the battery of the target device reaches a pre-defined higher level, or the termination of wireless power transfer can be subject to both of these criteria (i.e., terminate charge transfer when either the pre-defined lower level at the source or the pre-defined higher level at the target is reached).

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A first device comprising:
a display;
a processor coupled with the display;
a memory system coupled with the processor;
wireless communication hardware coupled with the memory system and the processor;
a battery coupled with the display, the processor, the memory system and the wireless communication hardware;
a coil; and
wireless charging circuitry coupled between the coil and the battery, wherein the wireless charging circuitry is configured to charge the battery using power received wirelessly through the coil, wherein the wireless charging circuitry is further configured to draw power from the battery and operate the coil to wirelessly transmit the power from the battery to a second device, wherein the memory system encodes instructions for the processor, the instructions are configured to, present a user interface on the display, receive an input through the user interface that indicates an amount of power to provide to the second device, monitor power drawn from the battery during operation of the coil to wirelessly transmit the power from the battery to the second device, and terminate the wireless power transmission to the second device when the indicated amount of power has been provided, and wherein the instructions encoded in the memory system are configured to cause the processor to:

receive an input that specifies two or more charge amounts for two or more second devices; and store the input that specifies the two or more charge amounts for later use when respective ones of the two or more second devices are paired with the processor.

2. The first device of claim 1, wherein the first device is a smartphone having a first side and a second side, the display is disposed on the first side, and the coil is disposed opposite the display and adjacent to the second side.

3. The first device of claim 2, wherein the second device is a wearable device.

4. The first device of claim 2, wherein the second device is a smartphone.

5. The first device of claim 2, wherein the wireless charging circuitry is configured to use inductive coupling between coils to wirelessly transmit the power from the battery to the second device.

6. The first device of claim 5, comprising a power management integrated circuit (PMIC) chip including the wireless charging circuitry.

7. The first device of claim 5, comprising a power management integrated circuit (PMIC) chip coupled with the wireless charging circuitry, wherein the wireless charging circuitry comprises wireless charging interface circuitry in another integrated circuit chip separate from the PMIC.

8. The first device of claim 2, wherein the wireless charging circuitry is configured to use resonant inductive coupling between coils to wirelessly transmit the power from the battery to the second device.

9. The first device of claim 1, wherein the coil is a single coil, and the wireless charging circuitry comprises:

receiver circuitry configured to charge the battery using the power received wirelessly through the single coil;

transmitter circuitry configured to draw the power from the battery and operate the single coil to wirelessly transmit the power from the battery to the second device; and protection and power transfer optimization circuitry between the receiver circuitry and the transmitter circuitry.

10. The first device of claim 1, wherein the instructions encoded in the memory system are configured to cause the processor to present in the user interface on the display a charge level of the battery, and wherein the received input, indicating the amount of power to provide to the second device, comprises input to indicate an amount of power to reserve in the battery after the wireless power transmission to the second device.

11. The first device of claim 10, wherein the instructions encoded in the memory system are configured to cause the processor to present in the user interface on the display a charge level of a battery of the second device, and wherein the received input, indicating the amount of power to provide to the second device, comprises input received as either a specified lower charge level for the battery coupled with the display or a specified target charge level for the battery of the second device after the wireless power transmission to the second device.

12. The first device of claim 11, wherein:

the display comprises a touchscreen, and the instructions encoded in the memory system are configured to cause the processor to present draggable user interface charge markers in the user interface through which the input is received;

a first of the draggable user interface charge markers is usable to specify the lower charge level for the battery coupled with the display;

a second of the draggable user interface charge markers is usable to specify the target charge level for the battery of the second device; and wherein the first and second draggable user interface charge markers are co-responsive to each other.

13. The first device of claim 1, wherein the instructions encoded in the memory system are configured to cause the process to:

find two or more second devices that can receive power wirelessly;

register at least one of the two or more second devices; and present the at least one registered second device in the user interface enabling selection for wireless power transfer to the at least one registered second device.

14. A non-transitory computer-readable medium encoding instructions, which when executed by a processor of a first device, cause the first device to perform operations comprising:

presenting a user interface on a display of the first device, wherein the first device comprises a battery, a coil, and wireless charging circuitry;

receiving an input through the user interface that indicates an amount of power to transfer wirelessly from the battery of the first device to a battery of a second device;

monitoring a battery charge level during operation of the coil to wirelessly transmit the power from the battery of the first device to the battery of the second device;

terminating the wireless power transmission to the battery of the second device after the indicated amount of power has been transferred;

finding two or more devices that can receive power wirelessly;

registering at least one of the two or more devices; and presenting the at least one registered device in the user interface enabling selection for wireless power transfer to the at least one registered device.

15. The non-transitory computer-readable medium of claim 14, wherein:

the operations comprise presenting in the user interface on the display a charge level of the battery of the first device; and receiving the input comprises receiving the input to indicate an amount of power to reserve in the battery of the first device after the wireless power transmission to the second device.

16. The non-transitory computer-readable medium of claim 15, wherein;
the operations comprise presenting in the user interface on the display a charge level of the battery of the second device; and
receiving the input comprises receiving the input as either a specified lower charge level for the battery of the first device or a specified target charge level for the battery of the second device after the wireless power transmission to the second device.

17. A non-transitory computer-readable medium encoding instructions, which when executed by a processor of a first device, cause the first device to perform operations comprising:
presenting a user interface on a display of the first device, the first device comprising a battery, a coil, and wireless charging circuitry;
receiving input through the user interface that indicates an amount of power to transfer wirelessly from the battery of the first device to a battery of a second device;
monitoring a battery charge level during operation of the coil to wirelessly transmit the power from the battery of the first device to the battery of the second device;
terminating the wireless power transmission to the battery of the second device after the indicated amount of power has been transferred;
presenting in the user interface on the display a charge level of the battery of the first device, wherein receiving the input comprises receiving the input to indicate an amount of power to reserve in the battery of the first device after the wireless power transmission to the second device; and
presenting in the user interface on the display a charge level of the battery of the second device, wherein receiving the input comprises receiving the input as either a specified lower charge level for the battery of the first device or a specified target charge level for the battery of the second device after the wireless power transmission to the second device,
wherein
the display comprises a touchscreen, and the operations comprise presenting draggable user interface charge markers in the user interface through which the input is received,
a first of the draggable user interface charge markers being usable to specify the lower charge level for the battery of the first device,
a second of the draggable user interface charge markers being usable to specify the target charge level for the battery of the second device, and
the first and second draggable user interface charge markers are co-responsive to each other in the user interface.

18. The non-transitory computer-readable medium of claim 17, wherein the operations comprise:
finding two or more devices that can receive power wirelessly;
registering at least one of the two or more devices; and
presenting the at least one registered device in the user interface enabling selection for wireless power transfer to the at least one registered device.

* * * * *